(12) United States Patent
Aliakseyeu et al.

(10) Patent No.: US 10,887,972 B2
(45) Date of Patent: Jan. 5, 2021

(54) LIGHTING TROUBLESHOOTING (71) Applicant: SIGNIFY HOLDING B.V., Eindhoven (NL)

(72) Inventors: Dzmitry Viktorovich Aliakseyeu, Eindhoven (NL); Jonathan David Mason, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/346,990

(22) PCT Filed: Oct. 26, 2017

(86) PCT No.: PCT/EP2017/077392
§ 371 (c)(1),
(2) Date: May 2, 2019

(87) PCT Pub. No.: WO2018/082994
PCT Pub. Date: May 11, 2018

(65) Prior Publication Data
US 2019/0269000 A1 Aug. 29, 2019

(30) Foreign Application Priority Data

Nov. 2, 2016 (EP) ..................................... 16196891

(51) Int. Cl.
H05B 47/19 (2020.01)
H04L 12/28 (2006.01)
(Continued)

(52) U.S. Cl.
CPC ......... *H05B 47/19* (2020.01); *H04L 12/2823* (2013.01); *H04W 40/246* (2013.01);
(Continued)

(58) Field of Classification Search
CPC ... H05B 47/19; H04L 12/2823; H04W 40/246
See application file for complete search history.

(56) References Cited

U.S. PATENT DOCUMENTS 8,396,414 B2 3/2013 Nelson et al.
8,614,954 B2 12/2013 McGee et al.
(Continued)

FOREIGN PATENT DOCUMENTS

WO 2016113146 A1 7/2016

*Primary Examiner* — Alexander H Taningco
*Assistant Examiner* — Pedro C Fernandez
(74) *Attorney, Agent, or Firm* — Meenakshy Chakravorty (57) ABSTRACT A lighting network (100) comprises a plurality of lighting devices (200, 300, 400A-H) each having at least one connection to a source device (101), the connection being either direct or indirect via one or more others of the lighting devices forming the indirect connection, each of the lighting devices comprising a respective light source. A method of troubleshooting the lighting network comprises steps of: identifying, for a target one of the lighting devices, at least one of said connections between the source device and the target lighting device; determining a characteristic of the identified connection from the source device to the target device, wherein the characteristic comprises a signal strength of the identified one of said connections and/or a latency of the identified one of said connections; and controlling at least one of the light sources to render a visualization of the identified connection between the source device and the target lighting device in the lighting network.

11 Claims, 9 Drawing Sheets (51) Int. Cl.
*H04W 40/24* (2009.01)
*H04W 84/18* (2009.01)

(52) U.S. Cl.
CPC ............... *H04L 2012/285* (2013.01); *H04L 2012/2841* (2013.01); *H04W 84/18* (2013.01)

(56) References Cited

U.S. PATENT DOCUMENTS

| | | |
|---|---|---|
| 8,823,277 B2 | 9/2014 | Chemel et al. |
| 8,830,081 B2 | 9/2014 | Aguirre et al. |
| 2008/0218087 A1 | 9/2008 | Crouse et al. |
| 2011/0026434 A1* | 2/2011 | Van Der Stok ....... G01S 5/0289 370/254 |
| 2013/0044488 A1* | 2/2013 | Hreish ................... F21V 33/00 362/253 |
| 2014/0265863 A1* | 9/2014 | Gajurel .................. H05B 45/10 315/131 |
| 2015/0208490 A1* | 7/2015 | Bishop ................... G08C 17/02 315/153 |
| 2016/0065910 A1* | 3/2016 | Fiedler ................ H04M 1/0291 348/156 |
| 2018/0007764 A1* | 1/2018 | Wendt .................. H05B 47/175 |

* cited by examiner

LIGHTING TROUBLESHOOTING

CROSS-REFERENCE TO PRIOR APPLICATIONS

This application is the U.S. National Phase application under 35 U.S.C. § 371 of International Application No. PCT/EP2017/077392, filed on Oct. 26, 2017, which claims the benefit of European Patent Application No. 16196891.2, filed on Nov. 2, 2016. These applications are hereby incorporated by reference herein.

TECHNICAL FIELD

The present disclosure relates to systems and methods for troubleshooting a lighting network having a mesh topology.

BACKGROUND

WO2016/113146A1 discloses an identification device for a lighting system. An identification request directed to a component causes neighboring components to emit an identification signal, thereby alerting a user to the direction or location of the component.

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

Lighting systems are part of this movement towards a connected infrastructure. A connected lighting system may comprise a plurality of lighting devices (luminaires) and a "bridge". The bridge is a coordinating device of the lighting system and is the source of control commands to be sent to the luminaires. The control commands may be either initiated locally at the bridge and provided to the luminaires or may be initiated in response to external input received by the bridge from outside the lighting network per se. For example, a user can provide user input to the lighting system via a first communication protocol (e.g. WiFi) to the bridge and then the bridge controls the luminaires in accordance with the user input using the particular communication protocol employed in the lighting network (e.g. ZigBee).

Often, the lighting network uses a mesh topology wherein each lighting device also acts as a relay for control signals originating from a source device (i.e. the bridge). That is, each lighting device acts as both an end device (which acts on received control commands for example by adjusting its illumination output according to those commands) and a relay device (by relaying i.e. "passing on" the control commands to a next device). Depending on the type of the command, the lighting device may act on it without relaying it further through the network, may relay it through the network to another lighting device(s), or may both act on it and relay it on. Such a lighting network therefore comprises at least some "primary" lighting devices which are in direct contact (i.e. direct wireless connection) with the bridge said to be zero "hops" away from the bridge. Lighting devices which are in direct contact with a primary lighting device but not the bridge itself are said to be one "hop" away from the bridge in the sense that control signals from the bridge to these lighting devices must pass through one other lighting device to reach them. These may also be called "secondary" lighting devices. This terminology can be extended. That is, lighting devices which are in direct contact with a secondary lighting device but not a primary lighting device or the bridge are two hops away from the bridge, and may also be called "tertiary" lighting devices, and so on.

In recent years, the number of connected devices has increased dramatically. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of colored lighting, dimming options and/or dynamic effects. In terms of control the most common approach is to replace a light switch with a smartphone based app that offers extended control over lighting (for example Philips hue, LIFX, etc.).

SUMMARY

In a lighting network having a mesh topology, all lighting devices which are not in direct communication with the bridge (i.e. all lighting devices which are one or more hops away from the bridge) rely on the operation of the lighting devices in the communication chain back to the bridge in order to receive control commands. Hence, if any of these devices fails or is moved out of wireless communication range, then the lighting device will no longer be able to receive control commands and operate correctly (unless it is able to establish a new communication route to the bridge via one or more other lighting devices).

Because of this, a user may wish to troubleshoot the lighting system to find out what is causing the problem in order to address it. However, in traditional mesh lighting networks, the topology of the network itself is hidden from the user. That is, the user is not informed of which lighting devices are primary lighting devices, secondary lighting devices etc.

The present invention recognizes that the lighting devices themselves can be used to visually indicate to the user information about the topology of the network, and in particular to visualize at least one connection of the lighting network between a source device and a target lighting device.

A first aspect of the present invention is directed to a method of troubleshooting a lighting network having a mesh topology, the lighting network comprising a plurality of lighting devices each having at least one connection to a source device, the connection being either direct or indirect via one or more others of the lighting devices forming the indirect connection, each of the lighting devices comprising a respective light source, the method comprising steps of: identifying, for a target one of the lighting devices, at least one of said connections between the source device and the target lighting device; and controlling at least one of the light sources to render a visualization of the identified connection between the source device and the target lighting device in the lighting network.

The visualizing is a light effect that visually identifies the connection to a user. That is, such that the user can see the route(s) taken by messages from the source device to the target lighting device as a consequence of the light emitted by the at least one light source. The primary function of the light sources and the lighting devices is one of providing illumination in normal use; in accordance with the present invention, those comments are being utilized to visualize a particular part of the lighting network topology (which is normally invisible) in a troubleshooting context, namely the identified connection(s) between the source device and the target lighting device.

This allows the user to visualize the routing of communication signals and therefore enables him to identify the cause of the problem and remedy it where possible. For example, the lighting devices may visually indicate the number of hops they are away from the bridge. The user can then easily see the layout of the mesh and is able to determine, for example, which other lighting devices must be functioning for a particular lighting device to operate (as these lighting devices form the communication chain back to the bridge from the lighting device in question).

In embodiments, the visualization may be dependent upon a quality of the message transmission, such signal strength, delay in forwarding a message (latency), number of hops involved etc.

That is, the method may comprise determining at least one characteristic of the identified connection from the source device to the target device, wherein the visualization of the identified connection conveys the determined characteristic.

For example, the at least one determined characteristic of the identified connection that is conveyed may comprise:
  a signal strength of the connection,
  a type of the connection,
  a number of said lighting devices forming the connection (zero for a direct connection; one or more otherwise), and/or
  a latency of the connection.

At least two of said connections between the source device and the target lighting device may be identified, and the at least one light source is controller to render a visualization of the at least two identified connections. For example, messages to the target lighting device may travel via different paths (i.e. via different connections) at different times, and all of those paths may be visualized.

For example, an average path or a combined path (i.e. all nodes involved at least once in the transmission) may be visualized.

The method may further comprise: determining, for at least one of the lighting devices, a type of its connection to the source device as direct or indirect; and controlling the light source of that lighting device to provide a visual indication conveying its determined connection type.

For example, the visual indication of the connection type may have a color unique to that connection type.

Determining the connection type as indirect may comprise determining the number of other lighting devices forming the indirect connection between that lighting device and the source device. The visual indication may convey the indirect connection type and the determined number of other lighting devices in that event.

Alternatively or in addition, the method may further comprise steps of: determining, for the at least one lighting devices, a signal strength and/or a latency for its connection to the source device; and controlling the light source of that lighting device to provide a visual indication conveying the determined signal strength and/or latency.

The at least one lighting device can for example be the target lighting and/or at least one of the lighting devices forming an indirect connection between the target lighting device and the source device where applicable. For example, where the target lighting device has an indirect connection to the source device, the steps of determining and controlling may be performed for the target lighting device and each of the one or more other lighting devices forming that indirect connection.

The method may further comprising a step of receiving user input denoting the target lighting device. That is, the target lighting device may be selected by a user, as part of the troubleshooting process.

The visualization may be rendered by controlling the light source of the target lighting device and any of the lighting devices forming the identified connection to render the visualization. For example, to render particular colors, hues etc. that visually distinguish those lighting device(s) form the rest of the lighting devices.

Alternatively or in addition the visualization is rendered by controlling (e.g. deactivating) all of the lighting devices other than the target lighting device and any of the lighting devices forming the at least one identified connection.

The source device can for example be a central control device, such as a bridge, or it may be one of the lighting devices.

Another aspect of the present invention is directed to a method of troubleshooting a lighting network having a mesh topology, the network comprising a plurality of lighting devices each having a connection to a source device, the connection being either direct or indirect via one or more others of the lighting devices, each of the lighting devices comprising a respective light source, the method comprising steps of: determining, for at least one of the lighting devices, a type of its connection to the source device as direct or indirect; and controlling the light source of that lighting device to provide a visual indication conveying its determined connection type.

In embodiments, if the connection is indirect, at least one of the light sources may be controlled so as to visually identify the one or more other lighting devices forming that indirect connection.

The method may further comprise a step of determining, for the at least one lighting devices, a signal strength for its connection to the source device; and the visual indication may convey both the connection type and the determined signal strength.

The method may further comprising a step of receiving user input denoting a target one of said lighting devices, the target lighting device having an indirect connection to the source device; and the steps of determining and controlling may be performed for each of the one or more other lighting devices forming that indirect connection in response to the user input.

Determining the connection type as indirect may comprise determining the number of other lighting devices forming the indirect connection between that lighting device and the source device.

The visual indication may convey the indirect connection type and the determined number of other lighting devices in that event.

Said controlling may be performed on condition that the connection type is determined to be direct, such that an illumination state of the light source remains unmodified if the connection is indirect.

The steps may further comprise determining, for at least one further one of the lighting devices, a type of its connection to the source device as direct or indirect; and wherein said controlling comprises controlling the further lighting device to provide a distinct further visual indication of its connection type on condition that its connection type is determined to be indirect.

Said controlling may be performed on condition that the connection type is determined to be indirect, such that an illumination state of the light source remains unmodified if the connection is direct.

The visual indication of the connection type may have a color the current in type.

The visual indication of the determined signal strength may comprise a varying hue, brightness, or saturation.

Another aspect of the present invention is directed to a computer program product comprising code stored on a computer readable storage medium and configured, when executed on a processor, to implement any of the method steps disclosed herein.

Another aspect of the present invention is directed to a controller for a lighting network having a mesh topology and comprising a plurality of lighting devices each having at least one connection to a source device, the connection being either direct or indirect via one or more others of the lighting devices forming the indirect connection, the controller comprising: a control interface configured to connect to the lighting network for controlling lighting sources of the lighting devices; and a processor configured to implement any of the method steps disclosed herein.

In embodiments, the processor may be configured to implement any feature of any embodiment of the first or second aspects.

The controller can be embodied in the source device itself. Alternatively, it can be a separate device, such a user device (e.g. smartphone).

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

People are beginning to take more of an interest in illuminating their homes in new ways. They are purchasing more mobile controllable lamps and luminaires than ever before. The use of mesh network allows a user to freely expand their system almost independently of the size of their home. However, current systems do not support troubleshooting when for example one of the lighting devices becomes unreachable because another lighting device was switched off. The complexity of the network is hidden from the user which is fine when system works seamlessly but can become an issue when lights stop behaving as expected.

In a mesh network, messages sent by the bridge are repeated by lighting devices in the network such that even if a specific lighting device is not directly within the reach of the bridge it can still get the message that is resend by another lighting device. However the user might not be aware of this and might observe an unpredictable behavior of some lamps due to the "intermediate" lamp or lamps being switched off using a power switch (e.g. a wall socket providing mains power to the lamp, or a local switch to the lamp controlling power from an internal battery). The present invention provides a method that allows a user to troubleshoot these types of problems.

Described embodiments allow the user to discover and visualize the network and thus understand why some lights might not always react to the user input. In particular, when the user attempts to activate a particular lighting device (target device) and it does not react, the user can enable troubleshooting mode where the system performs the following checks: determine if any of the lighting devices are reachable, based on the previously collected wireless (e.g. ZigBee) signal strength, check if the lighting devices closest to the bridge are reachable (closest in this context means within the network topology, i.e. zero hops away), then preferably request the user to first switch on lighting devices closest to the bridge, after which the command is resent. If it's successful a "light path" is visualized to the user i.e. the lighting device(s) via which the command is relayed to the target device are controlled to provide in their illumination a visual indication of the path through the network along which the command is relayed. For example an intermediate "hop" lighting device may change color or blink indicating to the user that this lighting device needs to be switched on or be in the standby mode for the lighting devices in question to be reachable and thus controllable.

Additionally when all lighting devices are switched on the user can request the system to display wireless communications ranges of the lighting devices using a visual indication such as color. For example, all lighting devices in direct reach of the bridge might turn green and other lighting devices (one or more hops away from the bridge) yellow. Additionally the troubleshooting method can be expanded by allowing the user the ability to turn on and off "hopping" for one or more specific lamps.

Figure 1:
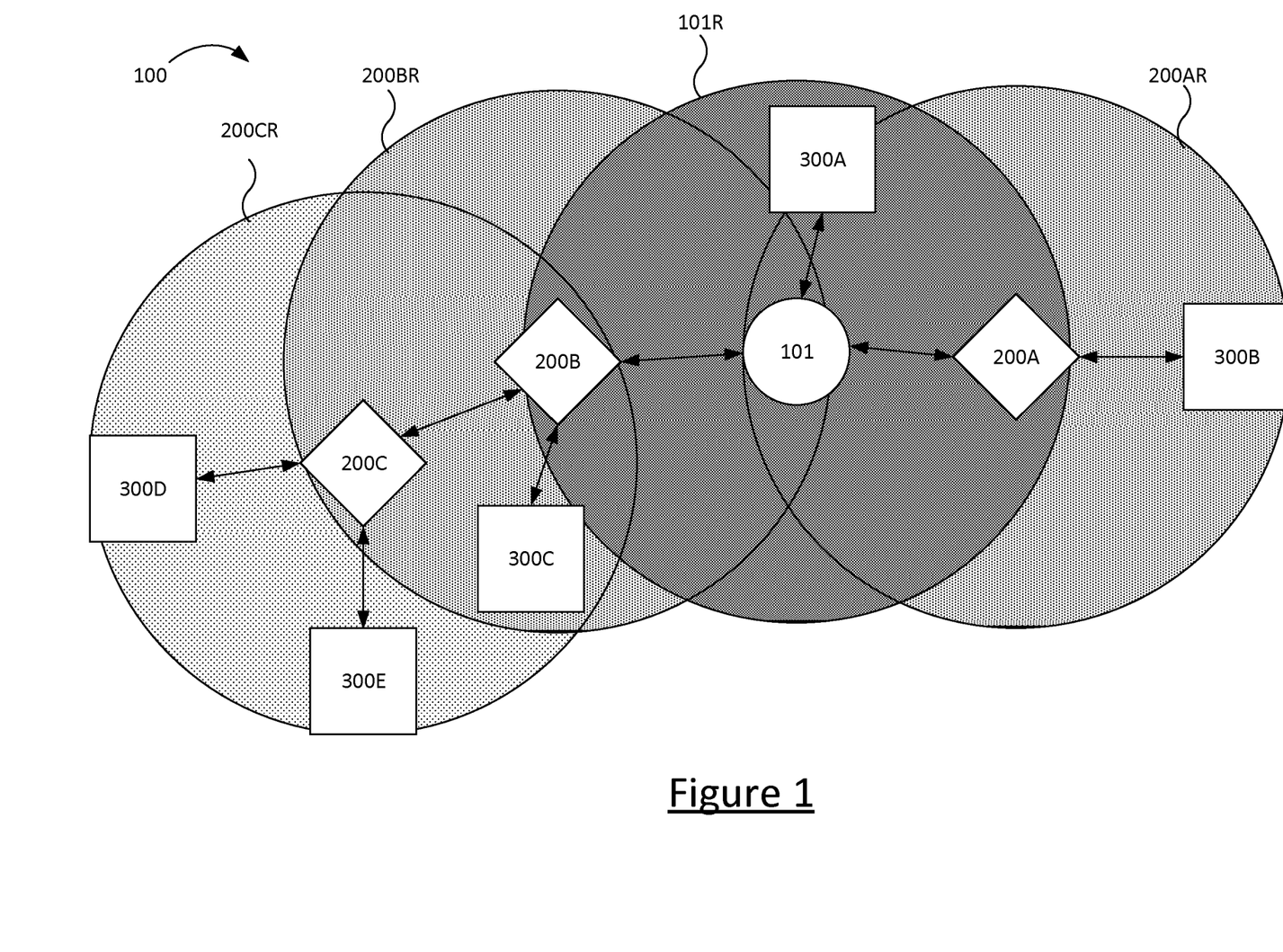
FIG. 1 shows a lighting network having a mesh topology.

FIG. 1 shows a lighting network 100 having a mesh topology. The lighting network 100 comprises a source device 101 (a bridge), a plurality of relay devices 200A-C (routers), and a plurality of end devices 300A-E. The devices in the network 100 are arranged to wirelessly communicate (e.g. according to the ZigBee protocol) with one or more other devices in the network 100 according to the mesh topology. It is appreciated that the particular arrangement shown in FIG. 1 and described below is merely exemplary.

In FIG. 1, the wireless communication range of the source device 101 is illustrated by area 101R. This area is shown as a circle having a radius approximately equal to the maximum distance from the source device 101 another device can be whilst still maintaining wireless communications with the source device 101. It is appreciated that the area 101R is merely exemplary and that, in general, the communicable area will likely not be a perfect circle due to the presence of anisotropic environment (e.g. walls, floors etc. which affect the transmission of wireless communication signals). That is, in the real situation the ranges are not fully based on the geometrical distance as they are affected by floors, walls, furniture and other object in the home of the user, such that a lighting devices that is physically close to the bridge is not necessarily in the direct reach. It is also appreciated that FIG. 1 is shown in two dimensions for the sake of clarity, but in reality the communicable range is a 3D range.

Similarly, the communicable ranges of relay devices 200A, 200B, and 200C are illustrated by areas 200AR, 200BR, and 200CR, respectively. The wireless ranges of the devices may be different for different devices.

The lighting network 100 of FIG. 1 comprises three types of devices:

1. The source device 101 (also called a coordinator) which selects a radio frequency band for communication within the network and selects a unique no. to identify the network, called the Personal Area Network ID (PAN ID); in the hue system this role is played by the bridge.
2. Routers 200 which join the network formed by the coordinator 101. After joining a network, the router also allows other end devices within its range to join the network. The router in addition to sending and receiving its own data, can also act as intermediate passing data from other nodes
3. End devices 300 which are sensors/controllers that uses the wireless network for data transmission/reception. The end device joins the network formed by the coordinator, and then can communicate with the coordinator.

Lighting devices can function as both routers and end devices. Hence, it is appreciated that the distinction between routers and end devices is merely functional, and that a single physical device (e.g. a lighting device) can provide both functionalities. Thus when a lighting device is not in the direct range of the source device 101, one of the other lighting devices that is in between can play a role of a router and retranslate the control message from the source device 101 to that lighting device.

In FIG. 1, end device 300A is in range of and in direct communication with source device 101. End device 300A is said to be zero "hops" away from the source device 101 according to conventional mesh network terminology.

The source device 101 is also in direct communication with routers 200A and 200B. Router 200A is in range of and in direct communication with end device 300B. End device 300B is not in direct communication with the source device 101 because it is out of range, but can still communicate with the source device 101 indirectly via relay device 200A which is in range of both the source device 101 and the end device 300B. End device 300B is said to be one "hop" away from the source device 101.

Router 200B is in range of and direct communication with both router 200C and end device 300C. End device 300C is not itself in range of source device 101, but it is able to communicate indirectly with source device 101 by relaying through relay device 200B. End device 300C is therefore one hop away from source device 101.

Router 200C is in range of and direct communication with both end devices 300D and 300E. End devices 300D and 300E can communicate with source device 101 even though they are not in direct communication range (i.e. in area 101R) by relaying messages through relay 200C and 200B. That is, messages from the source device 101 reach end device 300D via path 101-200B-200C-300D, and similarly for end device 300E. Hence, end devices 300D and 300E are two hops away from source device 101. In other words, there are two relay devices between the end devices and the source device 101 (note that this is equal to the number of hops).

Note that end device 300C is also within range of router 200C but they are not in direct communication because end device 300C is using relay device 200B to communicate with the source device 101.

In the particular scenario of an illumination command being relayed through a lighting network, the relays 200 are lighting devices (as other devices of the network) which relay the command to one or more other lighting devices (and may or may not adjust their own illumination according to the command). The end devices 300 are lighting devices which receive an illumination command, from the bridge 101 directly or from a relaying device 200, but do not relay it on. That is, lighting devices at which the command terminated. Whether or not a command is relayed can for example depend on the configuration of the lighting devices and/or a type of the command.

Figure 2:
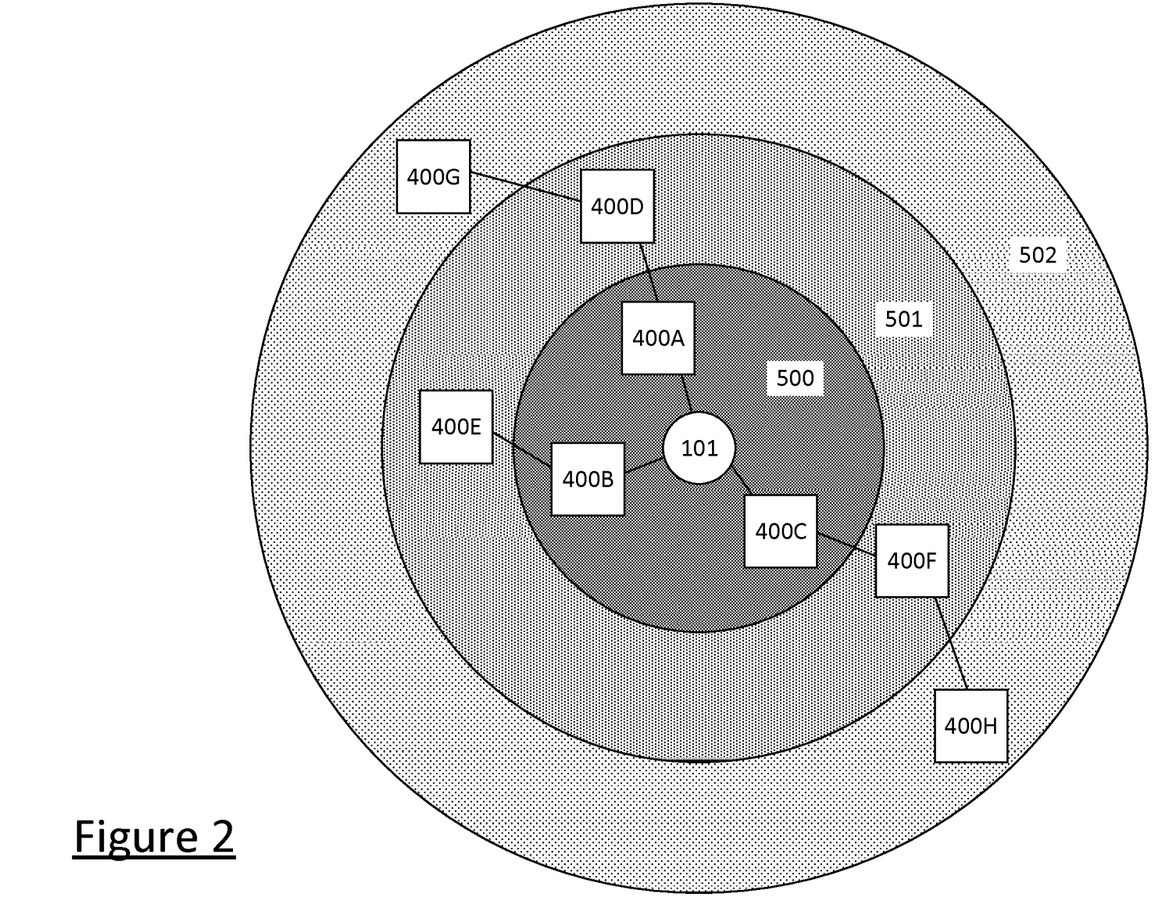
FIG. 2 shows a lighting network having a mesh topology.

FIG. 2 shows a simplified illustration of a mesh network. In this example, only lighting devices are shown, which perform the roles of both router and end device, as mentioned above.

The network comprises a source device 101, and a plurality of lighting devices 400A-H. The lighting device 400A-H are arranged by number of hops from the source device 101: lighting devices that are in direct reach 500, lighting devices that require one "hop" 501, and lighting devices that require two "hops" 502. Note that circles 500-502 do not indicate the wireless range of source device 101.

Figure 3:
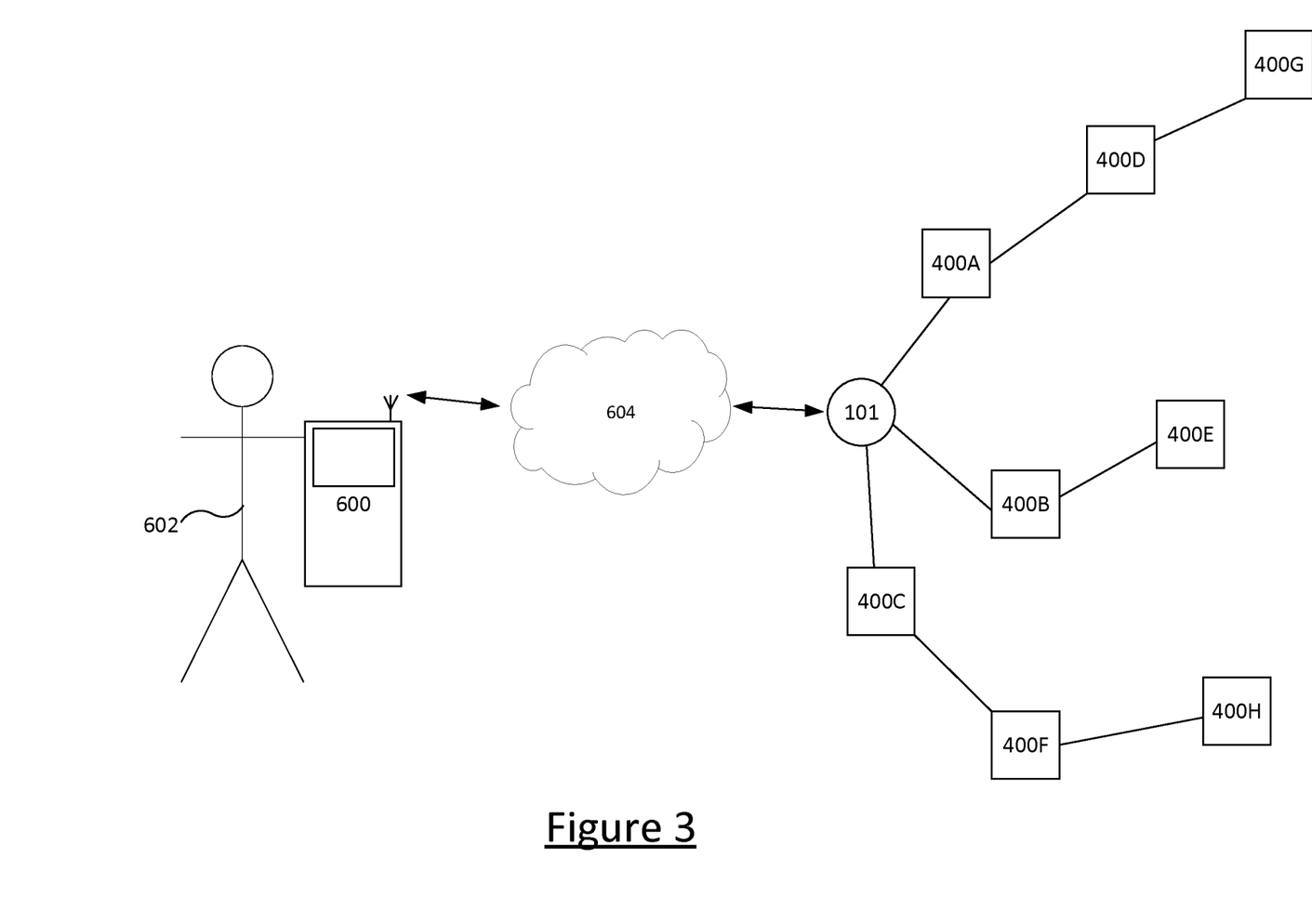
FIG. 3 shows a system comprising a lighting network and a user device.

FIG. 3 shows a system comprising the lighting network from FIG. 2 and a user device 600 operable by a user 602 to provide control input to the bridge 101 via communication network 604 (e.g. the Internet). The user device 600 may also be able to communicate directly with the bridge 101. The user device 600 may be any electronic device operable by the user 602 to transmit control input to, and optionally receive data from, the bridge 101. For example, the user device 600 may be a smart phone of the user 602 or any other portable electronic device with wireless communication capabilities known in the art. As is also known in the art, one or more mobile applications ("apps") may be running on a processor of the user device 600. One of these apps may provide a graphical output on a graphical user interface of the user device 600 to facilitate interaction with the user 602. For example, a lighting control app may provide the user 602 with information pertaining to the lighting network such as the current status of one or more lighting devices.

Because the wireless ranges of the devices in the network are not fully based on the geometrical distance (as mentioned above), it can be difficult for the user 602 to understand why, for example, one of the lighting devices that is close to the bridge 101 at times is not reachable by the system (i.e. in certain situations it might be in direct reach and in other situations it might require a "router" in between).

The present invention provides for troubleshooting of the lighting network using an application (or a feature of an existing lighting network control app). The app guides the user 602 through a couple of steps by requesting user input, and then visualizes the network to the user 602 indicating the gaps or critical points in the network (e.g. when for example several ligating device can only be reached if a specific lighting device is on or on standby). The indication is done visually by the lighting devices themselves.

FIGS. 4A-4D illustrate particularly advantageous embodiments of the present invention relating to methods enacted by the source device 101 or the user device 600. The methods illustrated therein may be worked separately, but may also be combined.

Figure 4A:
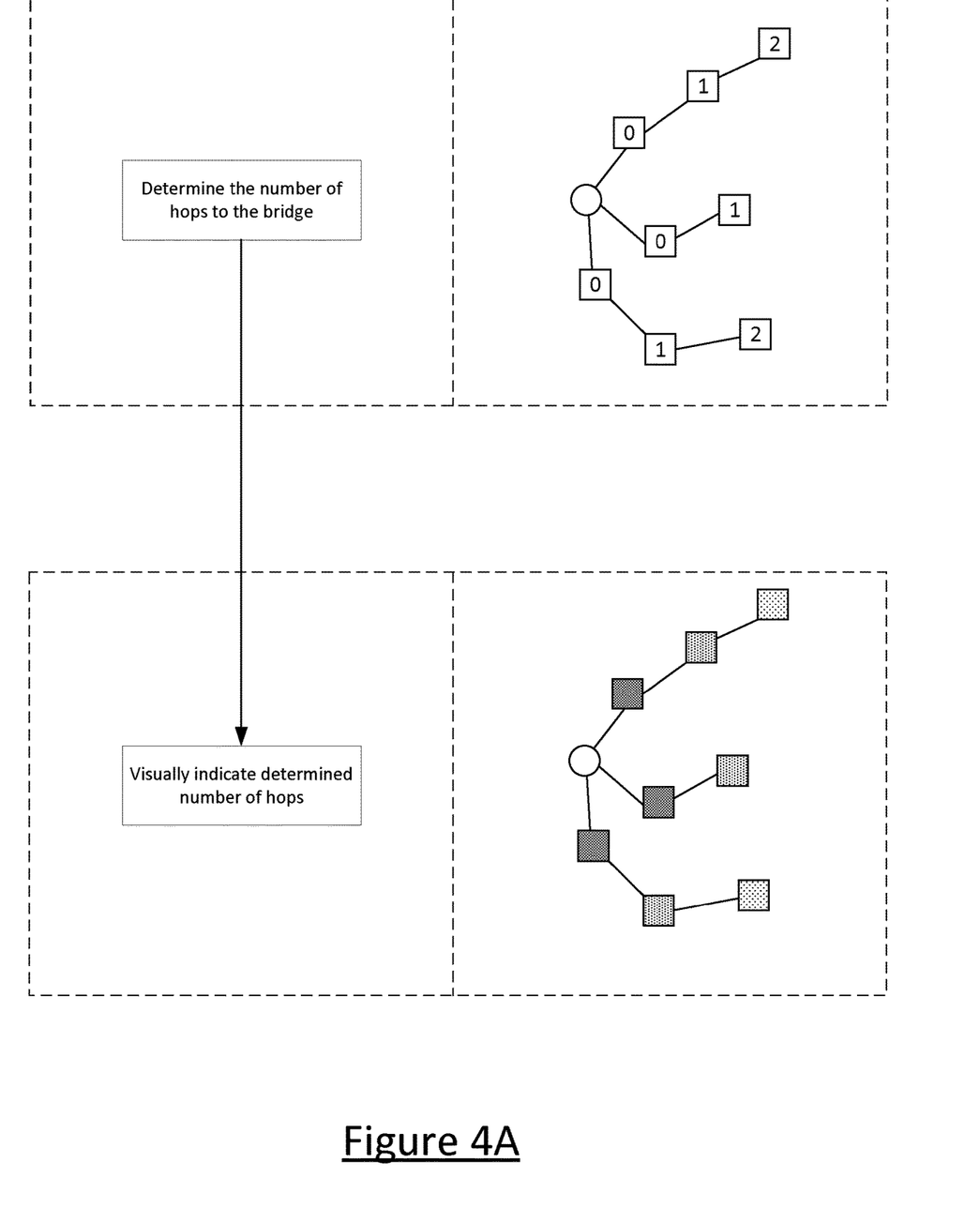
FIGS. 4A-4D are flowcharts of methods according to embodiments of the present invention.

The method of FIG. 4A is the generic case. In this method, the number of hops is determined and the visual indication is provided for all lighting devices in the network. That is, the bridge 101 determines the number of hops to each of the lighting devices and then controls each of the lighting devices to visually indicate the respective number of hops determined for that lighting device.

The respective number of hops for a given lighting device can be determined in various ways depending on the system.

For example, by transmitting a message comprising a counter from that lighting device to the bridge 101. The counter is updated by each relaying lighting device on the way to the bridge 101 and hence the bridge 101 is able to determine the hop number for the lighting device which initiated that message.

As another example, in ZigBee, every time new devices is added the network performs route discovery, and after that, provided the position of the devices has not changed when the system need to send a message to a particular lamp the address of that lamp would define the route (i.e. any intermediate device). Each device in the network knows the next hop in the path to destination: for example taking FIG. 1, if the message is sent from 101 to the 300D, 101 will first send the message to all its neighbors, node 300A and 200A will not recognize the address and will not retranslate the message further while 200B will recognize the address and will retranslate the message further, and so on. As such, based on the destination address every node would know if it's supposed to retranslate it or not.

The visual indication of the number of hops comprises a different respective lighting effect for different respective numbers of hops, e.g. different hues, brightnesses, saturations, blinking frequencies etc. For example, changing the color of light to indicate the number of hops that lighting device is away from the bridge 101, e.g. green direct reach, yellow one hop and red two hops etc. Lighting device output characteristics other than the color may be used, for example, in case of white lamps using dimming or blinking.

Figure 4B:
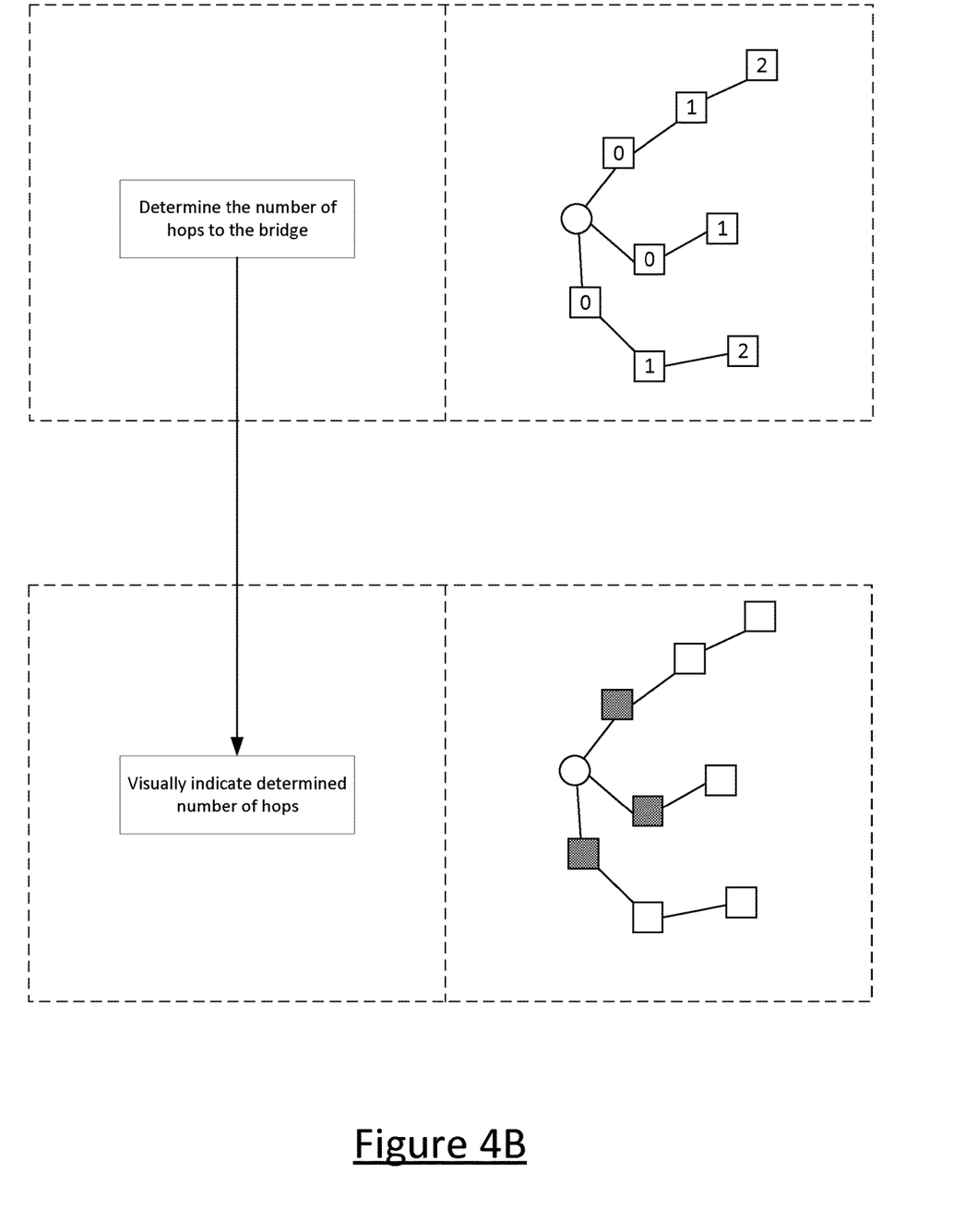

In FIG. 4B, the number of hops is again determined for all lighting devices. However, only the lighting devices for which the respective number of hops was determined to be zero (i.e. only the lighting devices in direct communication with the bridge 101) are controlled to visually indicate their number of hops (i.e. zero, for all of these lighting devices). The visual indication may be any suitable indication as before. Note that in this case the number of hops is the same for all lighting devices and hence so are the visual indications. The value of zero used here is merely exemplary and in general any integer number may be used. For example, the lighting devices for which the respective number of hops was determined to be one, two, or more might be controlled to provide a visual indication (and not any other lighting devices). This integer may be a predetermined integer set by the bridge 101 upon commissioning but may also or alternatively be alterable by the user 602 by providing input to the bridge 101 using user device 600.

A simpler embodiment of this method is to directly determine which lighting devices are directly connected to the bridge 101, e.g. by sending out a message from the bridge 101 which causes all lighting devices in range to respond with an identification of themselves. These responding devices are then implicitly those devices in the network for which the number of hops is zero, as above, but this method does not require determining the number of hops for other lighting devices (with hop number equal to or greater than one).

Figure 4C:
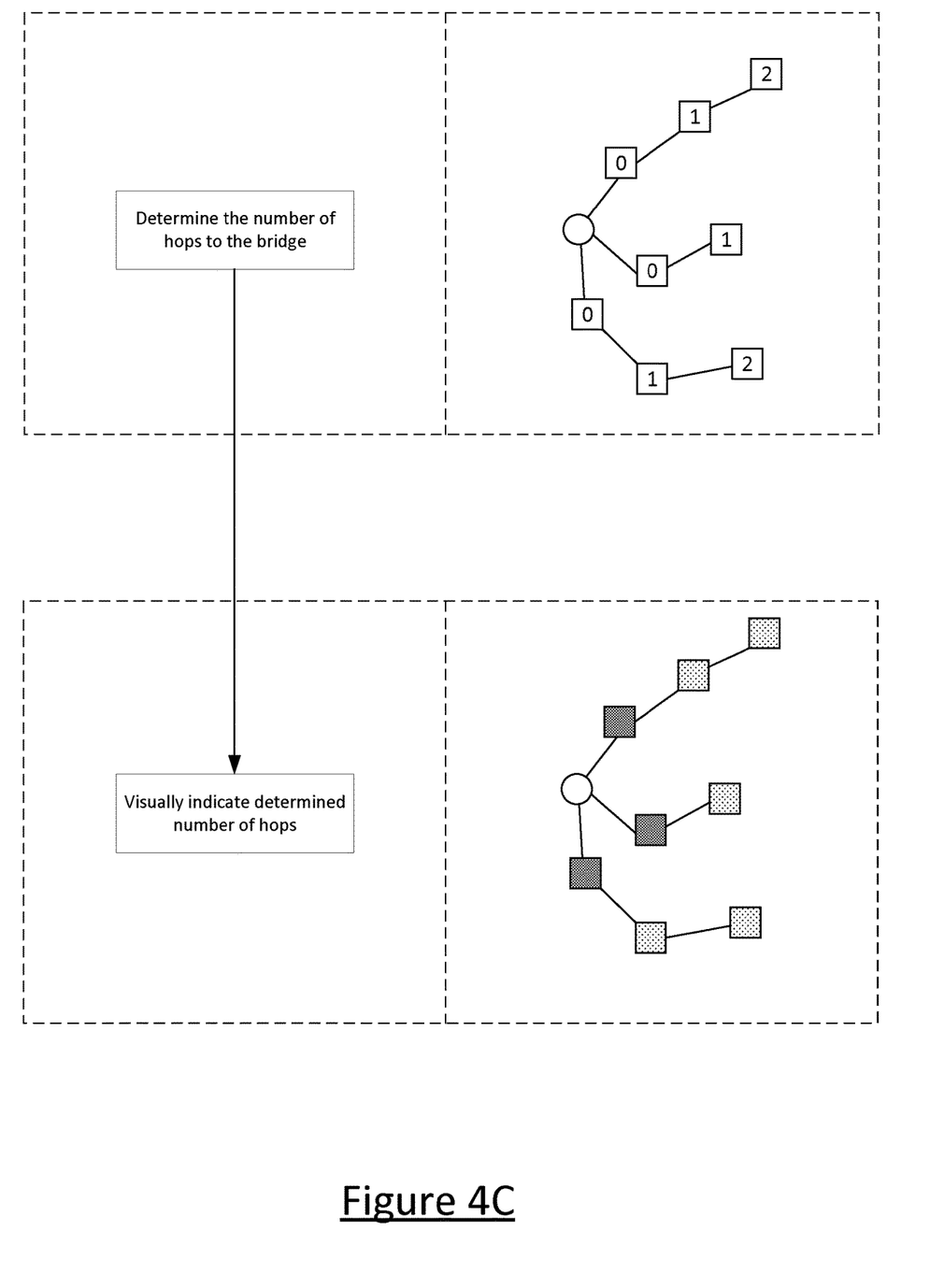

In FIG. 4C, the number of hops is again determined for all lighting devices. In this case, the visual indications are partitioned into two halves: a first visual indication for lighting devices having a hop number equal to zero and a second visual indication for lighting devices having a hop number equal to one or greater. The second visual indication is different from the first, and may comprise a hue, brightness, saturation, blinking, dimming etc. effect as described above in relation to the first visual indication.

A simpler embodiment of this method is to directly determine which lighting devices are directly connected to the bridge 101 (as above), and to directly determine which lighting devices are not connected to the bridge 101. For example, the set of all lighting devices in the network minus the set of directly connect lighting devices equals the set of indirectly connected lighting devices.

Note however that this may not always be necessary: for example, in the context of ZigBee, after a ZigBee network has been created as per the ZigBee protocol, the bridge will automatically know which devices are direct and which are indirect nodes. This is inherent in the creation and management of ZigBee mesh networks, so there is no need to add any additional recognition steps in this context. It's import to note however, that when bridge tries to reach a lamp that is marked as "direct" or zero hops, and is not able to, it will try to reach it with the use of hops so basically try to reconstruct part of the network and create a new route (in reality it can happen because for example user used the lamp in the living room and then moved it to the bedroom that is further away from the bridge). In other words, the topology of the network can change dynamically in use, with new direct and/or indirect connections being created automatically in response to fail communication attempts or detected changes within the network, for example.

Figure 4D:
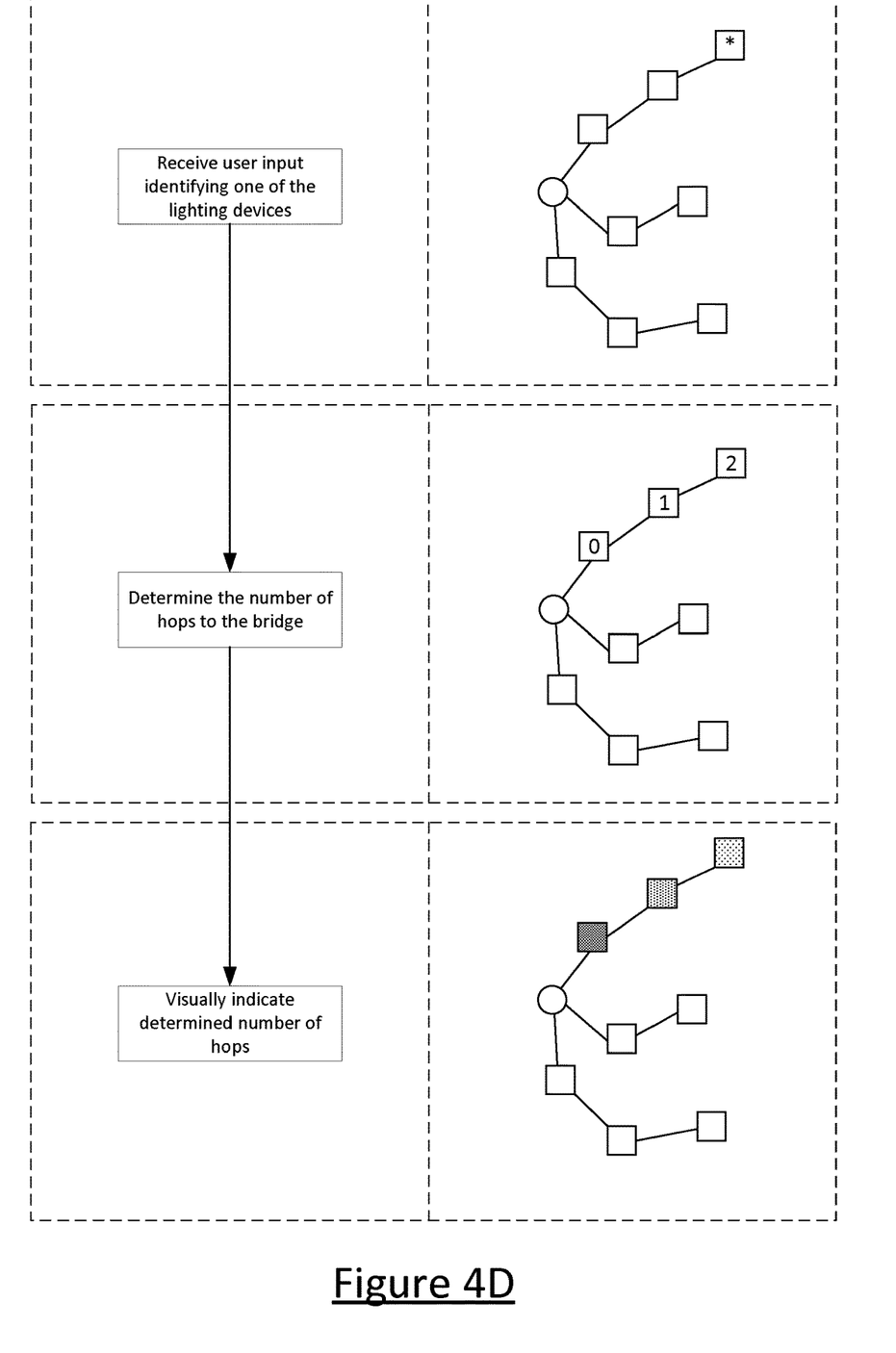

FIG. 4D the method further comprising a step of receiving user input relating to a selected one of the lighting devices ("target device"—indicated by star * in FIG. 4D). The method then proceeds to determining the number of hops, as before, but in this case the number of hops need only be determined for lighting devices which form part of the communication relay chain between the bridge 101 and the selected lighting device. The lighting devices on the relay chain only are then controlled to provide the visual indication (in accordance with any of the options given above). This is advantageous in that the user 602 may only be interested in visualizing the communication path from the bridge 101 to a particular one of the lighting devices through which control signals are routed to that lighting device. The user 602 can therefore easily visualize what lighting device (s) are used by the system to reach that lighting device and therefore are required to be on or in standby mode.

Figure 5:
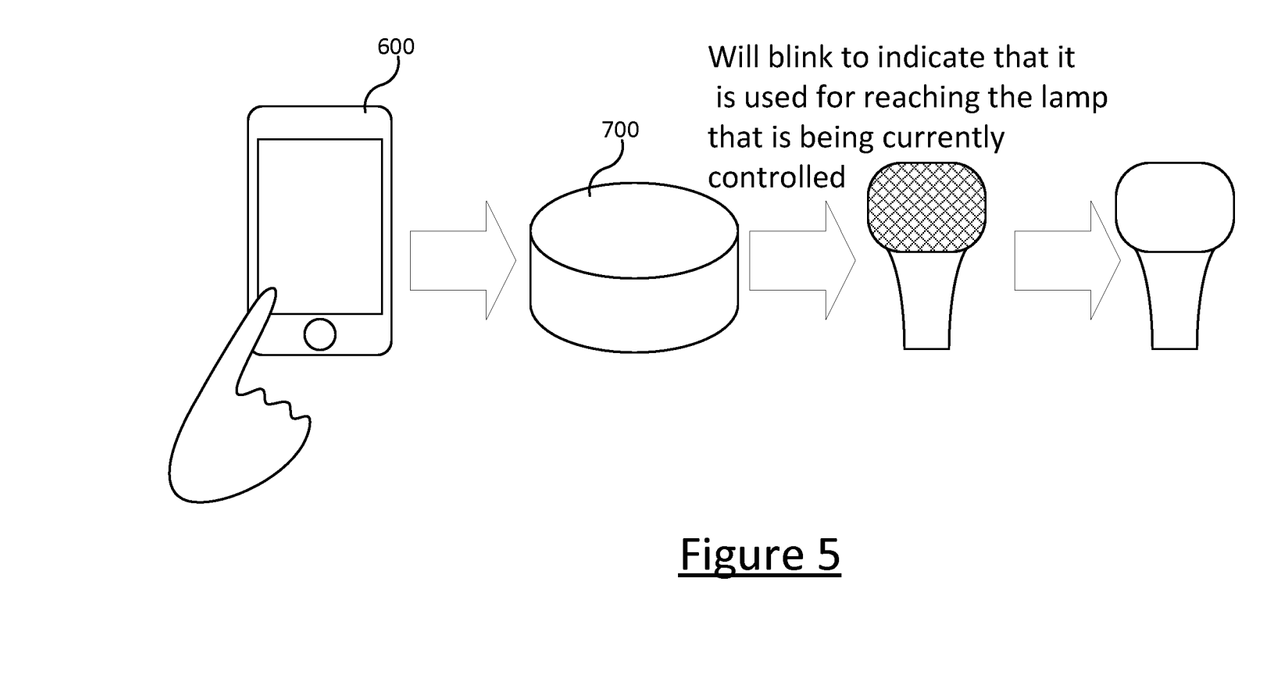
FIG. 5 shows a system in accordance with an embodiment of the present invention.

FIG. 5 shows another alternative in accordance with another embodiment of the present invention. In this embodiment, the user 302 again selects a particular lighting device (target device, as above) either explicitly by dedicated user input or implicitly via a normal control command. The bridge 101 then controls the lighting devices on the path between the bridge 101 and the target lighting device to provide a particular visual indication (e.g. blinking).

An extensions of the described techniques a user to visualize groups of lamps that use the same lamp as an intermediate and are directly connected to it, e.g. in FIG. 1 200C and 300C are a group of lamps that are directly reachable by 200B, so, for example, a user can select a lamp and ask the system to visualize lamps that are directly connected to it in the mesh network, so in the case of 200B, the resulting visualization (e.g. lamps changing color) would only include 200C and 300C, but not 300D and 300E despite the fact that they also need 200B but they also require an additional hop so they are not directly connected to 200B.

In this respect, it is noted that, whilst the source device can a centralized controller such as the bridge 101, it can also be one of the lighting devices themselves.

Figure 6:
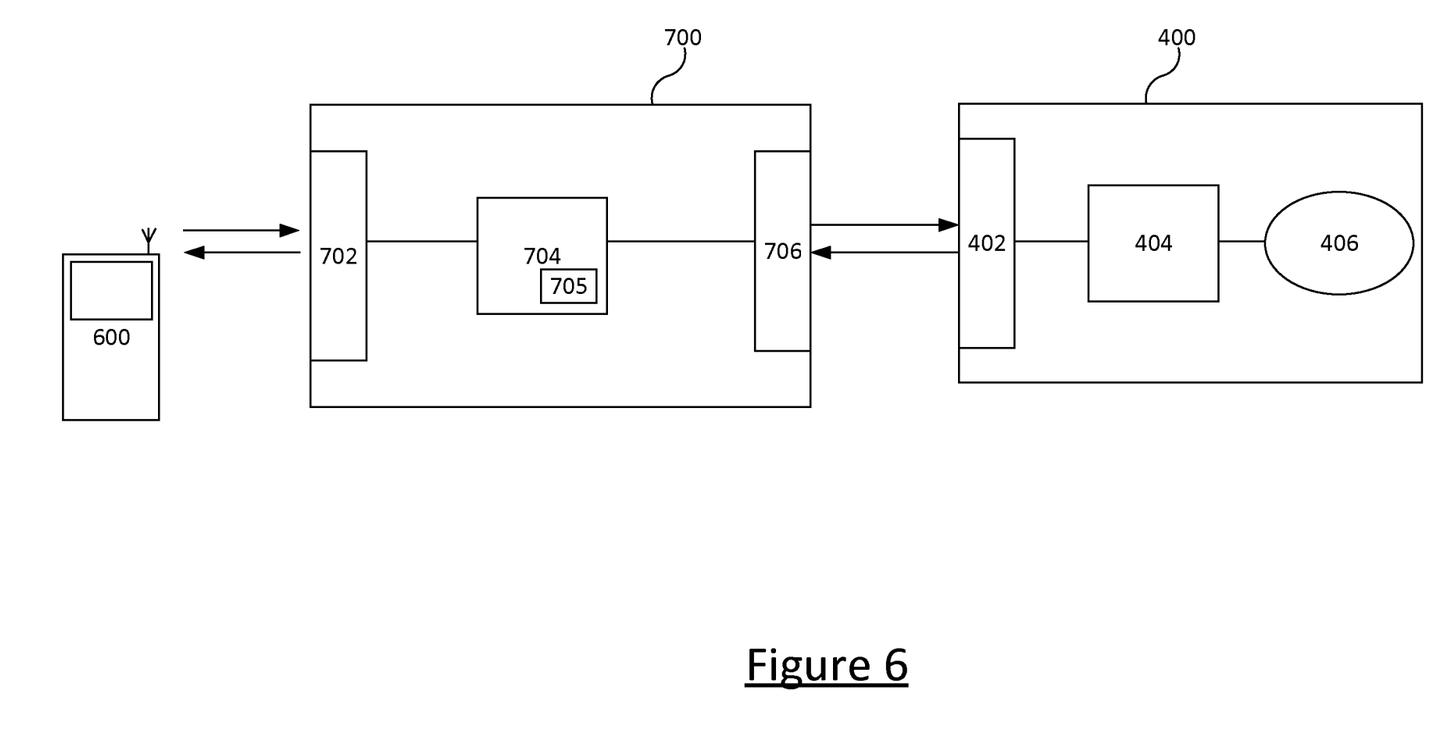
FIG. 6 is a block diagram showing a control system according to embodiments of the present invention.

FIG. 6 shows a schematic diagram of a system comprising the user device 600, a controller 700 and a lighting device 400. For simplicity, only one lighting device 400 is shown but it is appreciated that more may be present.

The controller 700 comprises a first communications interface 702, a processor 704, and a second communications interface 706. The first communications interface 702 is arranged to receive data signals from and provide data signals to the user device 600 (as mentioned above e.g. via WiFi). The second communications interface 706 is arranged to receive data signals from and provide data signals (control commands) to the lighting device(s) 400. The processor 704 is operably connected to both the first communications interface 702 and the second communications interface 706 and comprises one or more execution units arranged to run computer-executable code 705. The controller 700 may be implemented in either the bridge 101 or may be implemented in the user device 600 itself.

The lighting device 400 (also called a lamp, or luminaire) comprises a communications interface 402, a processor 404, and a light source 406. The communications interface 402 is arranged to receive control commands from, and provide data signals to the controller 700. The light source 406 may be any suitable controllable light source comprising one or more individual light source units such as one or more LEDs, one or more fluorescent bulbs, or one or more filament bulbs etc. The processor 404 is operably coupled to both the communications interface 402 and the light source 406. The processor 404 comprises one or more processing units and is arranged to receive control commands from the controller 706 via the communications interface 402 and process them in order to control the light source 406 in accordance with the received control commands. The processor 404 also, in the case of the lighting device 400 being a relay device, processes the received control commands to determine one or more further lighting devices the control command is to be relayed to, and transmits the control command to those lighting devices via the communications interface 402 (not shown in FIG. 6)

It will be appreciated that the above embodiments have been described only by way of example. Other variations to the disclosed embodiments can be understood and effected by those skilled in the art in practicing the claimed invention, from a study of the drawings, the disclosure, and the appended claims.

In other embodiments the system records the network path and relative signal strengths (e.g. ZigBee signal strength) for each lighting device. In this case, the method may further comprise a step of determining, for the some or all of the lighting devices, a signal strength of the data signal as received by that lighting device; and wherein the at least one of the lighting devices is further controlled to vary a property of the first visual indication in accordance with the determined signal strength.

More immediate feedback can be provided to the user. For example, if the user tries to control a lighting device that is currently not reachable by the bridge 101 and is known to the system to be outside of the direct reach (i.e. requires at least one relay lighting device), system checks the state of that (those) "router" lighting device(s). If the "router" lighting device(s) is (are) also not visible to the system (which means that its most probably switched off) the system notifies the user 602 that that specific lighting device (i.e. the relay device, or more than one relay device) should be also switched on or be in standby mode in order for the lighting device in question to become operational.

The visual indication of the number of hops in the system can also be used to provide an "educational mode" in the lighting network that uses a step by step guide to show the user 602 how the mesh network uses other lighting devices to send the signal. This can be a practical demonstration where the lights are controller (e.g. switched on and off) to convey the network topology. In some cases, additional information may also be provided via the app itself to offer advice on how to extend the range of the network, by providing a visual indication of the current limits of the mesh network. For example, to suggest a repositioning of one or more lights to extend the range.

Features on the app can also provide users with insight on how different building constructions (e.g. concrete, brick, stud wall), walls or floors, or distance can affect the signal and the mesh network's efficacy. To help visualize this the user could walk with a HueGo around their home and the color could change to show how strong the original signal is in any particular location, where in the home it needs to receive a hopped signal or where it is acting as a router, etc. That is, the visual indication may be provided by a portable luminaire, and may be modified in response to change in the portable luminaire's location.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of troubleshooting a lighting network having a mesh topology, the lighting network comprising a plurality of lighting devices each having at least one connection to a source device, the connection being either direct or indirect via one or more others of the lighting devices forming the indirect connection, each of the lighting devices comprising a respective light source, the method comprising steps of:
   identifying, for a target one of the lighting devices, at least one of said connections between the source device and the target lighting device;
   determining a characteristic of the identified connection from the source device to the target device, wherein the characteristic comprises a signal strength of the identified one of said connections and/or a latency of the identified one of said connections;
   determining, for at least one of the lighting devices, a type of its connection to the source device as direct or indirect, wherein determining the connection type as indirect comprises determining the number of other lighting devices forming the indirect connection between that lighting device and the source device; and
   controlling at least one of the light sources to render a visualization of the determined characteristic of the identified connection between the source device and the target lighting device in the lighting network.

2. The method according to claim 1, wherein at least two of said connections between the source device and the target lighting device are identified, and the at least one light source is controller to render a visualization of the at least two identified connections.

3. The method according to claim 1, further comprising:
controlling the light source of that lighting device to provide a visual indication conveying its determined connection type.

4. The method of claim 3, wherein the target lighting device has an indirect connection to the source device; and wherein the steps of determining and controlling are performed for the target lighting device and each of the one or more other lighting devices forming that indirect connection.

5. The method according to claim 3, wherein the visual indication of the connection type has a color unique to that connection type.

6. The method according to claim 1, further comprising a step of receiving user input denoting the target lighting device.

7. The method according to claim 1, wherein the visual indication conveys the indirect connection type and the determined number of other lighting devices in that event.

8. The method according to claim 1, wherein the visualization is rendered by controlling the light source of the target lighting device and any of the lighting devices forming the identified connection to render the visualization.

9. The method according to claim 1, wherein the visualization is rendered by controlling all of the lighting devices other than the target lighting device and any of the lighting devices forming the at least one identified connection.

10. A computer program product comprising code stored on a non-transitory computer readable storage medium and configured, when executed on a processor, to implement the method of claim 1.

11. A controller for a lighting network having a mesh topology and comprising a plurality of lighting devices each having at least one connection to a source device, the connection being either direct or indirect via one or more others of the lighting devices forming the indirect connection, the controller comprising:
a control interface configured to connect to the lighting network for controlling lighting sources of the lighting devices; and
a processor configured to perform steps of:
identifying, for a target one of the lighting devices, at least one of said connections between the source device and the target lighting device, determining a characteristic of the identified connection from the source device to the target device, wherein the characteristic comprises a signal strength of the identified one of said connections and/or a latency of the identified one of said connections;
determining, for at least one of the lighting devices, a type of its connection to the source device as direct or indirect, wherein determining the connection type as indirect comprises determining the number of other lighting devices forming the indirect connection between that lighting device and the source device; and
controlling at least one of the light sources to render a visualization of the determined characteristic of the identified connection between the source device and the target lighting device in the lighting network.

* * * * *